US011381325B1

(12) United States Patent
Gruber

(10) Patent No.: US 11,381,325 B1
(45) Date of Patent: Jul. 5, 2022

(54) METHOD AND SYSTEM FOR DETERMINING AN OPTIMUM POSITION OF A DEVICE UNDER TEST

(71) Applicant: Rohde & Schwarz GmbH & Co. KG, Munich (DE)

(72) Inventor: Ingo Gruber, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/154,382

(22) Filed: Jan. 21, 2021

(51) Int. Cl.
*H04B 17/27* (2015.01)

(52) U.S. Cl.
CPC .................... *H04B 17/27* (2015.01)

(58) Field of Classification Search
CPC ....................................................... H04B 17/27
See application file for complete search history.

(56) References Cited

U.S. PATENT DOCUMENTS

| | | | | |
|---|---|---|---|---|
| 2017/0168501 A1* | 6/2017 | Ogura | ............... | G05D 1/0038 |
| 2018/0262281 A1* | 9/2018 | Qi | ............... | H04B 7/0413 |
| 2018/0321301 A1* | 11/2018 | Harteneck | ............... | G01V 3/083 |
| 2019/0191268 A1* | 6/2019 | Rowell | ............... | H04W 4/80 |
| 2019/0334637 A1* | 10/2019 | Koebele | ............... | H04B 17/16 |
| 2019/0391196 A1* | 12/2019 | Rowell | ............... | H01Q 3/34 |
| 2020/0066404 A1 | 2/2020 | Peters et al. | | |
| 2020/0119443 A1* | 4/2020 | Leather | ............... | H04B 17/23 |
| 2020/0191848 A1* | 6/2020 | Grossmann | ............... | G01R 29/10 |
| 2020/0220632 A1 | 7/2020 | Derat | | |
| 2020/0358538 A1* | 11/2020 | Olgaard | ............... | H04B 17/0085 |

FOREIGN PATENT DOCUMENTS

JP    2002107398 A  *  4/2002

OTHER PUBLICATIONS

W. Fan, P. Kybsti, L. Hentila and G. F. Pedersen, "MIMO Terminal Performance Evaluation With a Novel Wireless Cable Method," in IEEE Transactions on Antennas and Propagation, vol. 65, No. 9, Sep. 2017, pp. 4803-4814 (Year: 2017).*

* cited by examiner

*Primary Examiner* — Gennadiy Tsvey
(74) *Attorney, Agent, or Firm* — Christensen O'Connor Johnson Kindness PLLC

(57) ABSTRACT

A method for determining an optimum position of a device under test when testing the device under test over-the-air is described. The method includes providing an anechoic chamber with a quiet zone, providing a device under test within the anechoic chamber, the device under test having at least two antennas, positioning the device under test within a testing area inside the anechoic chamber, the testing area including an optimum position for the device under test with respect to the quiet zone; and providing an interactive feedback signal while repositioning the device under test, wherein based on the interactive feedback signal a position of the device under test is adjusted to match the optimum position. Furthermore, a system for determining an optimum position of a device under test is provided.

16 Claims, 6 Drawing Sheets

METHOD AND SYSTEM FOR DETERMINING AN OPTIMUM POSITION OF A DEVICE UNDER TEST

FIELD OF THE DISCLOSURE

The present disclosure generally relates to a method for determining an optimum position of a device under test when testing the device under test over-the-air. The disclosure also relates to a corresponding system.

BACKGROUND

In case of radio frequency measurements of a device under test (DUT) well-defined testing conditions are of high importance. Measurement chambers are used to reduce external noise which may cause disturbances on the measurement signals used for testing the DUT.

In larger chambers, a large quiet zone can be ensured, namely a large volume in which the signals used for testing the DUT have nearly uniform amplitude and phase. Due to the large quiet zone, the DUT can be placed completely within the quiet zone, typically a sweet spot in the middle of the chamber and each position within a certain area around the sweet sport, thereby ensuring good testing conditions. In other words, the exact antenna position of the DUT (left corner or right corner) becomes irrelevant since the entire DUT can be placed in the quiet zone.

However, in smaller chambers the quiet zone becomes smaller. For example, the quiet zone may typically have dimensions of less or much less than 5 cm. Accordingly, the exact position of the antenna(s) inside the DUT, for example relative to the quiet zone, becomes relevant as the at least one antenna could be unintentionally placed outside the quiet zone. Hence, subsequent measurements become tainted. A testing engineer regularly faces the problem that the exact positions of the at least one DUT antenna is unknown and cannot be determined without opening the device.

One approach to circumvent this problem is using large measurement chambers such that the DUT will be placed inside the quiet zone without troubles concerning the exact position of the at least one antenna inside the DUT. However, this approach requires non-compact measurement set-ups causing high costs.

A different approach relates to implementing additional sensing devices evaluating the exact position(s) of the antenna(s) of the DUT relative to the quiet zone or rather to a try-and-error testing method. However, the first approach causes higher equipment costs, whereas the second approach is more time-consuming, resulting in higher costs as well.

Accordingly, there is need for a cost-effective and fast way to optimize the position of a DUT relative to a measurement system in an appropriate manner, preferably providing a direct indication such that the confidence level is improved whether or whether not the position of the DUT is already optimized.

SUMMARY

The subject matter of present disclosure satisfies the respective need or others. Some specifics of the present disclosure are described with regard to corresponding methods. However, the advantages and embodiments described with regard to the indicated devices are correspondingly to be transferred to the according methods and vice versa.

A summary of certain embodiments disclosed herein is set forth below. It should be understood that these aspects are presented merely to provide a brief summary of these certain embodiments and that these aspects are not intended to limit the scope of this disclosure. This disclosure may encompass a variety of aspects that may not be set forth below.

According to a first aspect, the present disclosure provides examples of a method for determining an optimum position of a device under test (DUT) when testing the device under test over-the-air. In an embodiment, the method comprises the step of providing an anechoic chamber with a quiet zone, and the step of providing a DUT within the anechoic chamber. In this embodiment, the device under test has at least two antennas. The method may also comprise the step of positioning the device under test within a testing area inside the anechoic chamber. In an embodiment, the testing area comprises an optimum position for the DUT with respect to the quiet zone. The method may further include the step of providing an interactive feedback signal while repositioning the DUT. Based on the interactive feedback signal or a related reference quantity derived thereof a position of the DUT is adjusted to match the optimum position.

Examples of the method are advantageously suitable for adjusting a position of the DUT relative to the optimum position even if a size of the DUT matches or substantially matches a size of the quiet zone. In other words, even if the quiet zone is very small, the method reliably allows the optimum position of the DUT to be achieved, thereby ensuring that the at least one antenna of the DUT is located within the quiet zone. According to examples of the method, the exact (absolute) position of the DUT does not need to be known or even be evaluated. Hence, the testing engineer does not have to request the respective information from the manufacturer of the DUT. Accordingly, expensive auxiliary equipment to determine the position of the DUT can be avoided. Also, a trial-and-error approach with regard to finding the optimum position can be avoided such that the overall time required for testing the DUT is reduced significantly. Put differently, the efficiency and the speed of optimizing the position of the DUT are advantageously improved.

Generally, the quiet zone provided by the anechoic chamber is a volume within the anechoic chamber where any reflected energy from walls, e.g. side walls, ceiling and floor, will be much lower than any of the features of interest on the radiation pattern. Therefore, the signals used for testing the DUT have nearly uniform amplitude and phase. In other words, the anechoic chamber provides a "quiet" environment for electromagnetic wave measurements within the quiet zone since no echo and no extraneous energy occur in the respective volume associated with the quiet zone.

In some embodiments, examples of the method are used to position the DUT within an already calibrated measurement setup/equipment correctly. The measurement setup/equipment may have been calibrated previously by separate devices. In some embodiments, at least one antenna of the measurement setup/equipment may have been calibrated appropriately, thereby ensuring far field conditions in the testing area, namely the quiet zone.

The feedback signal or a related reference quantity derived thereof may comprise an acoustic signal. Accordingly, a test engineer may notice the feedback signal acoustically while he is able to simultaneously optimize the position of the DUT manually or to perform corresponding actions. By placing the DUT into the anechoic chamber, the test engineer directly receives the acoustic feedback. Therefore, the trial-and-error approach can be avoided as the feedback is obtained directly in an acoustic way.

The quiet zone may be established by at least one of an indirect far field or a direct far field. Examples of the method are advantageously suitable for quiet zones established by both types, indirect and direct far fields. At least one reflector may be provided that reflects signals emitted from an antenna so as to create far field conditions, and therefore the quiet zone, at small distances since the propagation path of the signals emitted is enlarged by the at least one reflector. Moreover, an antenna array may be provided that comprises several antennas that are individually controlled so as to create a direct far field and, therefore, a quiet zone in a small chamber directly.

The optimum position of the DUT may be determined depending on the wireless cable method (WCM). Advantageously, the flexibility of the testing mechanism is improved compared to conductive cable methods. In addition, it is not necessary to locate a cable within the anechoic chamber, which may have an influence on the testing. Thus, better or rather more reliable measurement results are ensured. Further, wireless cable method testing is mandatory with regard to certain measurement profiles, such as e.g. base band tactical data link fading profiles.

In general, the wireless cable method (WCM) is a radiated testing method, where signals can be guided over-the-air (OTA) to respective antenna ports, namely the antennas of the DUT, just like in the conducted cable case but without RF cable connection.

The WCM is performed while the DUT is moved within the anechoic chamber in order to find the optimum position of the DUT.

The feedback signal or the related reference quantity derived thereof may be determined based on determining an inverse channel matrix G by solving the equation G×H=I, wherein I is an identity matrix, and wherein H is a channel matrix describing characteristics of the channels associated with the different antennas of the DUT depending on the position of the DUT within the anechoic chamber. In other words, the matrix H may describe the influence on the channel(s) due to the specifics of the measurement setup and the influences on the channel and/or among the channels on each other.

Generally, the respective channels defined by the channel matrix are established between each of the antenna associated with the measurement equipment and each of the antennas of the DUT. For instance, the channel matrix may relate to a 2×2 matrix in case that the measurement equipment has two antennas and the DUT has two antennas.

During the testing of the DUT, the inverse channel matrix G can be applied on the measurement signals generated, thereby ensuring that the inverse channel matrix G compensates/equalizes the channel matrix H that is present due to the OTA measurement performed. Accordingly, the inverse channel matrix G and the channel matrix H together, namely their respective product, correspond to the identity matrix that corresponds to a cable setup. Therefore, cable-like properties are ensured even though OTA testing is performed, namely a wireless testing.

By solving the above equation and determining the inverse matrix G, a virtual wireless cable may be determined such that the above-mentioned influences may advantageously be compensated. As a benefit of determining the inverse channel matrix G, the so derived matrix G may be applied for all devices which are of equal type compared to the DUT based on which the matrix G is determined. Accordingly, based on the matrix G the DUT may be placed at the optimum position and any further devices which are of equal type may be placed at the exact same position. As a consequence, repeatedly determining the inverse channel matrix G may be avoided.

Stated differently, the over-the-air (OTA) link of the antenna(s) of the DUT and at least one antenna of the measurement setup causes disturbances in each of the signals of the antenna(s) of the DUT and between those signals. This leads to generally unknown correlations between the transmit signals of the measurement setup and the received signals received by the antennas of the DUT. However, the performance tests which are carried out here require a well-defined signal correlation involving fading effects. The inverse channel matrix G is chosen such that it inverts the effects of the OTA link. Accordingly, a virtual wireless cable may be created once the appropriate inverse channel matrix G is found. In case the appropriate inverse channel matrix G is found, the measurement configuration corresponds to perfect radio frequency (RF) conditions such that any lower layer impairments are compensated for.

In general, the at least one antenna of the measurement setup creates the direct or indirect far field, thereby establishing the quiet zone.

In an alternative or in addition, the feedback signal or the related reference quantity derived thereof may be determined based on a separation between a first stream and a second stream associated with the first antenna and the second antenna of the DUT, respectively. In this case, the optimum position may be found if the separation between the first and the second streams exceeds a predetermined threshold value. The separation between the streams of the channels corresponding to the first and second antenna of the DUT depends on the influences on the first and second streams due to the measurement setup and between the streams on each other themselves. As these influences are affected by the position of the DUT within the testing area, the position of the DUT can be optimized by continuously evaluating the separation between the streams. Once the separation is equal to or larger than a predetermined threshold value, the position of the DUT may be considered being optimized. The predetermined threshold value may be determined based on calibration measurements. For example, the predetermined threshold value of the separation between the first and second streams may be at least 5 dB, preferably 8 dB, more preferably 12 dB, even more preferably 15 dB.

The streams may be provided by two different antennas of the measurement equipment, for example simultaneously. The streams provided by the antennas of the measurement equipment are received by the antennas of the DUT.

The feedback signal may be acoustically indicated utilizing a noise. Accordingly, the noise may be in a frequency range noticeable for humans under usual conditions. Usual conditions may be understood as the noise having a loudness according to an appropriate frequency such that the noise is commonly noticed by humans, even if ambient noise is present.

In an alternative or in addition, the feedback signal may be visually indicated utilizing a light. In this case, the light may be in a frequency range noticeable for humans under usual conditions. Usual conditions may accordingly be understood as the light having a brightness according to an appropriate frequency such that the light is commonly noticed by humans, even if ambient light is present.

The optimum position may be arranged within the quiet zone such that all antennas of the DUT are located within the quiet zone if the DUT is placed at the optimum position. That means that the quiet zone has a minimum size corresponding to the spacing of the antennas of the DUT. Moreover, if the quiet zone is larger than that spacing, the optimum position of the DUT may include any locations within the quiet zone such that both antennas remain within the quiet zone. However, that also means that the quiet zone may ultimately be reduced in size until it matches the spacing between the antennas of the DUT. Therefore, the testing area can be correspondingly reduced in size. A very compact measurement setup may be realized.

Examples of the method may be suitable for blackbox positioning of the DUT with respect to the optimum position. Blackbox testing may be considered a testing mechanism such that no direct access to the DUT is made during (re-)positioning of the DUT. In contrast, the DUT may be moved utilizing an indirect movement mechanism. For example, the DUT may be moved using a magnetically coupled indirect device positioner. Other indirect positioning mechanisms may be applied as well. Due to the blackbox testing, the testing area may be better defined. Hence, interferences caused by ambient noise may be avoided.

At least one characteristic of the interactive feedback signal or the reference quantity derived thereof may vary while the DUT is moved within the testing area. As previously described, the feedback signal may be acoustically indicated utilizing a noise. For example, the noise can vary in loudness and/or in frequency in response to a movement of the DUT relative to the optimum position. Further, the acoustic feedback may relate to a repetitive tone, wherein the repetition rate is varied accordingly. The variation of the noise may depend on determining the separation between the streams corresponding to the antennas of the DUT and/or on the inverse channel matrix G, as explained before.

According to a further aspect, the present disclosure provides examples of a system for determining an optimum position of a DUT. In an embodiment, the system comprises an anechoic chamber and a DUT. The anechoic chamber has a testing area. The testing area comprises an optimum position for the DUT with respect to a quiet zone of the anechoic chamber. The DUT has at least two antennas. The system comprises a processing circuit that is configured to process a sensor signal indicative of a position of the DUT within the testing area. The processing circuit is configured to generate an interactive feedback signal or a reference quantity derived thereof based on the sensor signal received such that the position of the DUT is adjustable to match the optimum position based on the interactive feedback signal or the reference quantity during repositioning of the DUT. Accordingly, a very compact system is provided which does not require any auxiliary sensing components to determine the position of the DUT. Moreover, the system enables the optimum position of the DUT within the quiet zone to be reliably determined without utilizing a time consuming try-and-error approach.

Examples of the system may comprise a loudspeaker that is configured to output the feedback signal or the reference quantity derived thereof that comprises an acoustic signal. In an alternative, examples of the system may comprise a different indicator module configured to output an indicator signal derived from the feedback signal or the reference quantity derived thereof.

Examples of the system may comprise at least one antenna that is configured to generate the quiet zone that may be established by at least one of an indirect far field and a direct far field. Accordingly, this antenna is not part of the DUT but rather of the remaining part of the measurement setup. For example, the antenna may be part of a measurement equipment associated with the anechoic chamber.

The processing circuit may be configured to determine the optimum position based on a wireless cable method (WCM). Hence, higher integration, higher frequencies and larger antenna systems may be realized. In addition, the flexibility of the testing mechanism is improved compared to conductive cable methods using RF cables.

The processing circuit may be configured to determine the feedback signal or the reference quantity derived thereof based on determining an inverse channel matrix G by solving the equation G×H=I, wherein I is an identity matrix, and wherein H is a channel matrix describing characteristics of the channels associated with the different antennas of the DUT depending on the position of the DUT within the anechoic chamber. The processing circuit may in particular derive the above-mentioned equation to determine the inverse channel matrix G in a mathematical manner.

The processing circuit may be configured to determine the feedback signal based on a separation between a first stream and a second stream of the first antenna and the second antenna of the DUT, respectively. The optimum position of the DUT may be considered to be determined by the processing circuit if the separation between the first stream and the second stream exceeds a predetermined threshold value. The predetermined threshold value may be determined based on calibration measurements. For example, the predetermined threshold value of the separation between the first and second streams may be at least 5 dB, preferably 8 dB, more preferably 12 dB, even more preferably 15 dB. The separation between the streams may also be determined in a mathematical manner. Accordingly, the processing circuit may comprise further computing components and resources.

The processing circuit may be configured to generate the feedback signal or the reference quantity derived thereof acoustically indicatable utilizing a noise. Accordingly, the noise may be in a frequency range noticeable for humans under usual conditions.

In an alternative or in addition, the processing circuit may be configured to generate the feedback signal or the reference quantity derived thereof that is visually indicated utilizing a light. In this case, the light may be in a frequency range noticeable for humans under usual conditions.

All antennas of the DUT may be located in the quiet zone if the DUT is placed at the optimum position. In some embodiments, the anechoic chamber and/or the testing area may be designed accordingly.

Examples of the system may be configured for blackbox positioning of the DUT with respect to the optimum position. Stated differently, no direct access to the DUT inside the anechoic chamber may be possible when measurements are conducted. Rather only indirect access may be allowed. Hence, the testing configuration can be better defined.

Generally, the DUT may of course comprise more than two antennas. The above-mentioned specifics are correspondingly transferred in this case.

At least one characteristic of the interactive feedback signal or the reference quantity derived thereof may be dependent on a movement of the DUT within the testing area. For instance, the correlation between the characteristics of the channels or the separation between the streams of the antennas of the DUT may vary upon a movement of the DUT relative to the quiet zone of the anechoic chamber. As a consequence, a noise signal and/or light signal may vary in at least one of intensity, loudness, and frequency to indicate that the DUT is approaching or moving away relative to the optimum position on the testing area inside the anechoic chamber.

All features and embodiments disclosed with respect to the second aspect of the present disclosure are combinable alone or in (sub-)combination with any one of the first aspect of the present disclosure, and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Of course, the features disclosed hereinafter with respect to any example embodiment and/or the accompanying FIGURES can be employed alone or in any combination or sub-combination.

Figure 1:
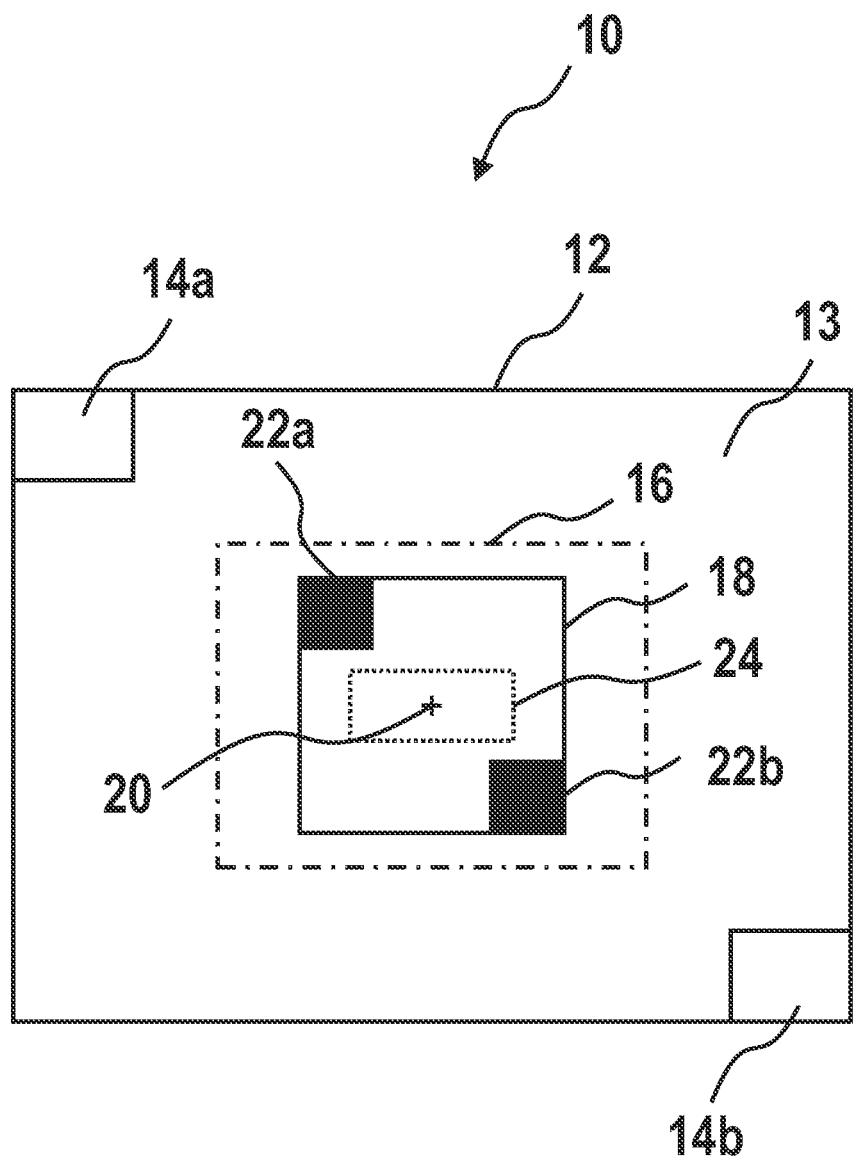
FIG. 1 is a schematic drawing of the general system according to an embodiment of the present disclosure.

FIG. 1 is a schematic drawing of a system 10 for determining an optimum position of a device under test (DUT) when testing the DUT over-the-air. The same system 10 may be used for testing the DUT. Hence, the system 10 may relate to a general measurement setup.

The system 10 comprises an anechoic chamber 12 having a testing area 13. According to this embodiment the anechoic chamber 12 comprises a first and a second measurement antenna 14a, 14b to provide direct far field conditions in the testing area 13, thereby creating a quiet zone 16. In an alternative embodiment, the measurement antennas do not need to be arranged within the anechoic chamber 12 but may be placed outside. Furthermore, the far field may also be established in an indirect manner by using at least one reflector.

As mentioned above, the quiet zone 16 is established (schematically illustrated by the dash-dotted line) within the anechoic chamber 12 and the testing area 13. Inside the quiet zone 16 relative to the measurement antennas 14a, 14b a homogeneous or substantially homogeneous radio frequency (RF) field is established showing no or at least negligible inhomogeneous local disturbances caused by external noise.

FIG. 1 also schematically shows the device under test (DUT) 18. The center position of the DUT 18 is indicated by a cross 20. Accordingly, the DUT 18 is placed inside the quiet zone 16. The DUT 18 comprises, for example, a first and a second antenna 22a, 22b, which according to the present embodiment are located inside the quiet zone 16 as well.

The quiet zone 16 comprises an optimum position 24 (dotted line). The quiet zone 24 encompasses all locations such that when placing the DUT 18, for example its (geometric) center, at any of these locations, the antennas 22a, 22b of the DUT 18 remain within the quiet zone 16.

Figure 2:
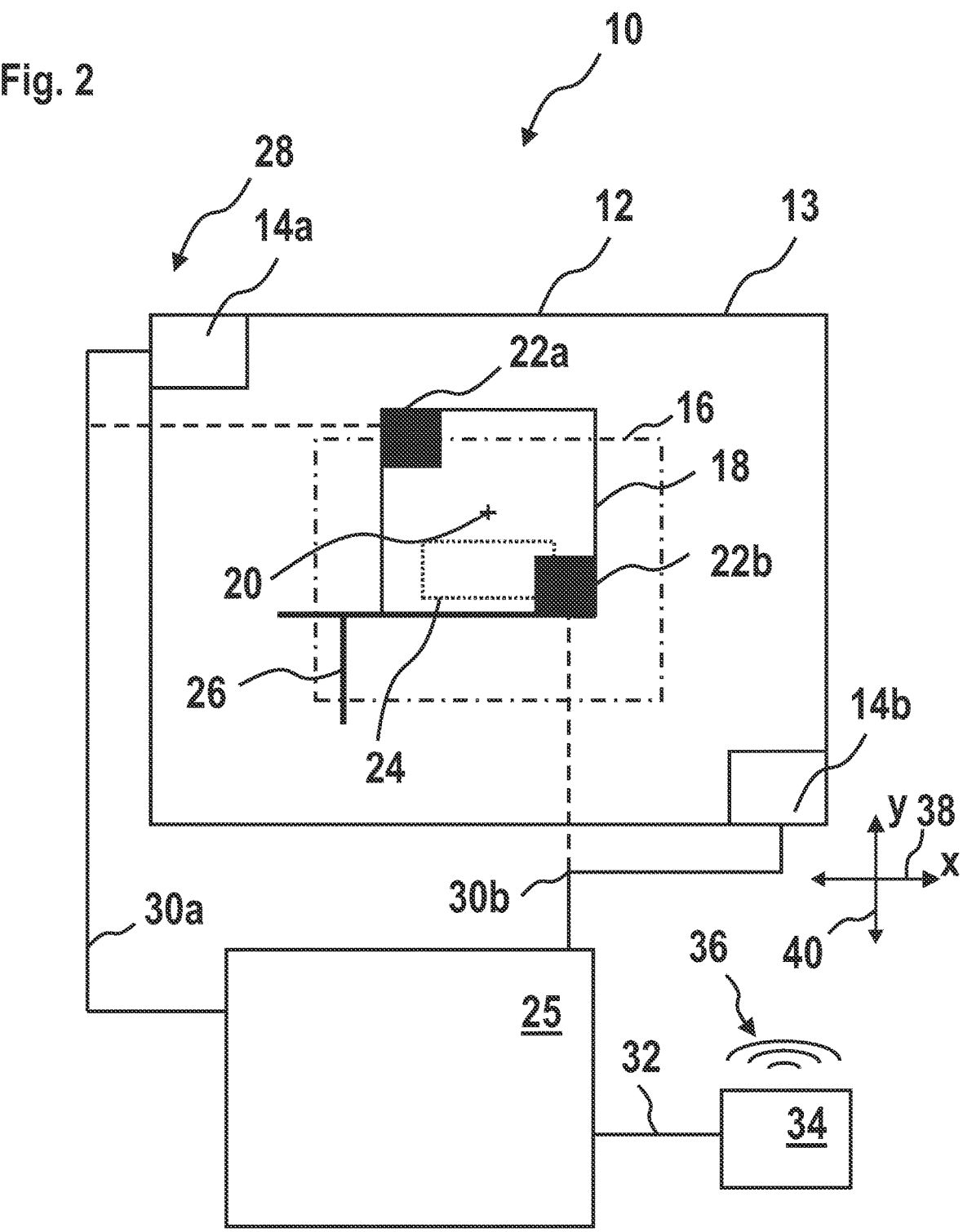
FIG. 2 is a schematic drawing of the system according to the present disclosure in more detail.

FIG. 2 is a schematic drawing of the system 10, namely the measurement setup, including a processing circuit 25. The system 10 generally corresponds to the before-mentioned system 10. Therefore, the following discussion concentrates on the specific differences between these embodiments.

The system 10 and especially the anechoic chamber 12 may fulfill the requirements of blackbox testing. This means that during measurements a direct access to the DUT 18 is prevented.

In order to be able to (re-)position the DUT 18 an indirect positioner 26 is provided. The indirect positioner 26 may, e.g., be magnetically coupled to the DUT 18. Accordingly, by the positioner 26 the DUT 18 may be movable inside the anechoic chamber 12, and may be moved inside the testing area 13.

In some embodiments, the processing circuit 25 may comprise at least one processor and may be configured to store computer-readable instructions and programs that, when executed by the processor, cause the processing circuit 25 to perform desired actions, such as determining a feedback signal, etc.

The processing circuit 25 may also comprise a memory of any transitory, non-transitory, volatile, nonvolatile, magnetic, optical, or electrical media, such as a random access memory (RAM), read-only memory (ROM), non-volatile RAM (NVRAM), electrically-erasable programmable ROM (EEPROM), flash memory, or any other digital or analog media. The processor may be configured as a microprocessor (µP), a microcontroller (µC), a digital signal processor (DSP), a central processing unit (CPU), a graphical processing unit (GPU), or any combination thereof. Furthermore, the processor may include one or more levels of caching, such as a level cache memory, one or more processor cores, and registers.

In addition, the processing circuit 25 may comprise at least one communication interface. By the communication interface the processing circuit 25 may for example be configured to communicate with the first and second antennas 22a, 22b of the DUT 18. The communication interface may be suitable for wired or wireless communication. In some embodiments, the wireless communication includes WiFi, Bluetooth, Zigbee, and/or near-field communication (NFC).

In some embodiments, the processing circuit 25 may be coupled to the first and second antennas 22a, 22b of the DUT 18 as well as the measurement antennas 14a, 14b. In some embodiments, the processing circuit 25 is part of a measurement equipment 28.

Although solid lines 30a, 30b are shown with regard to the connection with the measurement antennas 14a, 14b, this should not be construed as limiting the present embodiment to wired connections. Rather, the connections can be of wireless type. In some embodiments, the connections are of the wireless type.

Further, the processing circuit 25 may be directly connected with the antennas 22a, 22b of the DUT 18, e.g. via a connection terminal, or rather indirectly via the measurement antennas 14a, 14b. Therefore, the respective connection between the processing circuit 25 and the antennas 22a, 22b of the DUT 18 is indicated by the dashed lines.

The processing circuit 25 is also coupled by a wired or wireless connection 32 to an output, such as an indication module 34 (e.g., a loudspeaker). The indication module 34 is configured to output an indicator signal 36, such as for example a noise. In an alternative, the indication module 36 may also be configured to output a light. Still further, it may be possible to output a noise and a light simultaneously.

Generally, the processing circuit 25 is configured to determine a feedback signal or a reference quantity derived thereof based on the position of the DUT 18 relative to the optimum position 24. In this regard, for example signal or streams received by the first and second antennas 22a, 22b of the DUT 18 may be evaluated.

The respective streams are transmitted by the measurement antennas 14a, 14b based upon signal received from the measurement equipment 28. Accordingly, the streams are generated by the measurement equipment 28 and forwarded to the measurement antennas 14a, 14b. The measurement equipment 28 may also comprise a modulation or rather fading module via which a certain testing scenario can be applied for testing purposes such that the streams are generated according to the respective testing scenario. This will be described later in more detail.

The processing circuit 25 may also be configured to receive signals from the DUT 18, for example the antennas 22a, 22b of the DUT 18, wherein the processing circuit 25 evaluates the signals received in order to gather information with regard to the DUT 18, for example its position.

The processing circuit 25 may also be configured to provide a respective control signal to the indication module 34 such that an indicator signal 36 may then be varied based on a movement of the DUT 18 relative to the optimum position 24. For example, the DUT 18 may be moved laterally along two perpendicular directions (x, y) 38, 40 which may lead to a modification of a loudness or a frequency of a noise emitted by the indication module 34.

Similarly, a brightness or a frequency of a light emitted by the indication module 34 may be altered upon movement of the DUT 18 relative to the optimum position 24.

Figure 3:
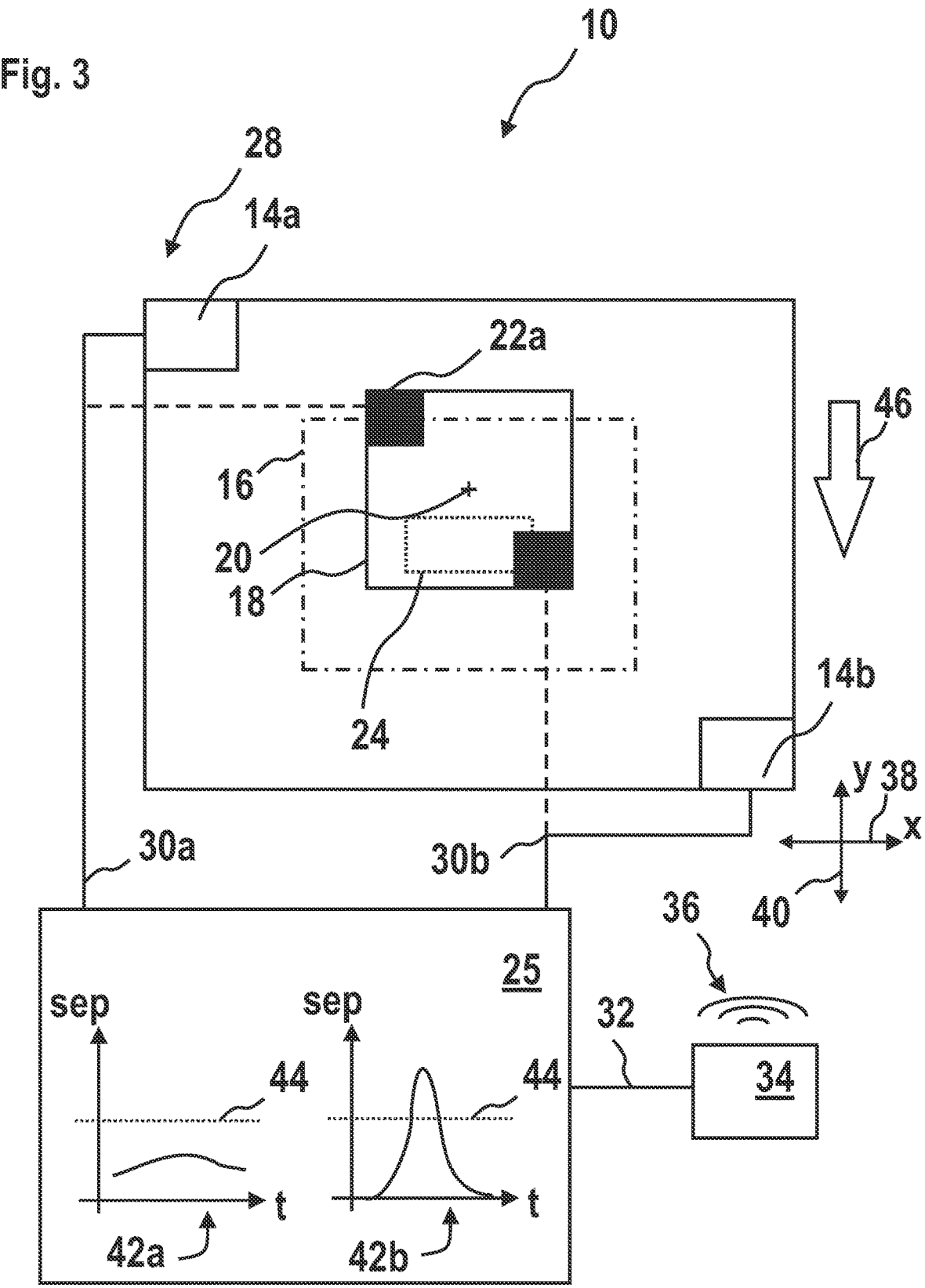
FIG. 3 is a schematic overview of a non-optimized placement of the DUT.

FIG. 3 is a schematic drawing of a non-optimized placement of the DUT 18. The system 10 generally corresponds to the before-mentioned systems 10. Therefore, the following discussion concentrates on the specific differences between these embodiments.

Here, some specifics of the determining an optimum position 24 of the DUT 18 are illustrated. According to the presented placement of the DUT 18, the DUT 18 is not at an optimum position 24.

Firstly, cross 20 indicating the center position of the DUT 18 is not within the optimum position 24. Secondly, antenna 22a is not within the quiet zone 16.

The processing circuit 25 evaluates the streams of the first and second antennas 22a, 22b. In some embodiments, the processing circuit 25 evaluates the separation between the streams, exemplarily shown in graphs 42a, 42b, where the separation between the streams is shown versus time.

As antenna 22a is not placed inside the quiet zone, disturbances are caused which leads to a reduced separation between the streams. The separation between the streams will be rather low, which is exemplarily shown in the first graph 42a. For example, the separation between the first and second stream does not match or exceed a predetermined threshold value 44 (dotted line). Therefore, the position of the DUT 18 is determined by the processing circuit 25 to be non-optimized. Accordingly, a respective indicator signal 36 is emitted by the indication module 34 indicating that the DUT 18 needs to be repositioned.

During the movement (indicated by arrow 46) of the DUT 18 the separation between the first and second stream of the first and second antenna 22a, 22b is continuously evaluated and the emitted indicator signal 36 is adapted accordingly.

Once the separation between the first and second stream matches or exceeds the predetermined threshold value 44, shown in the second graph 42b, the position of the DUT 18 is considered being optimized.

The respective evaluation is done by a wireless cable method (WCM) that will be described hereinafter in more detail when referring to FIGS. 4 to 6.

Figure 4:
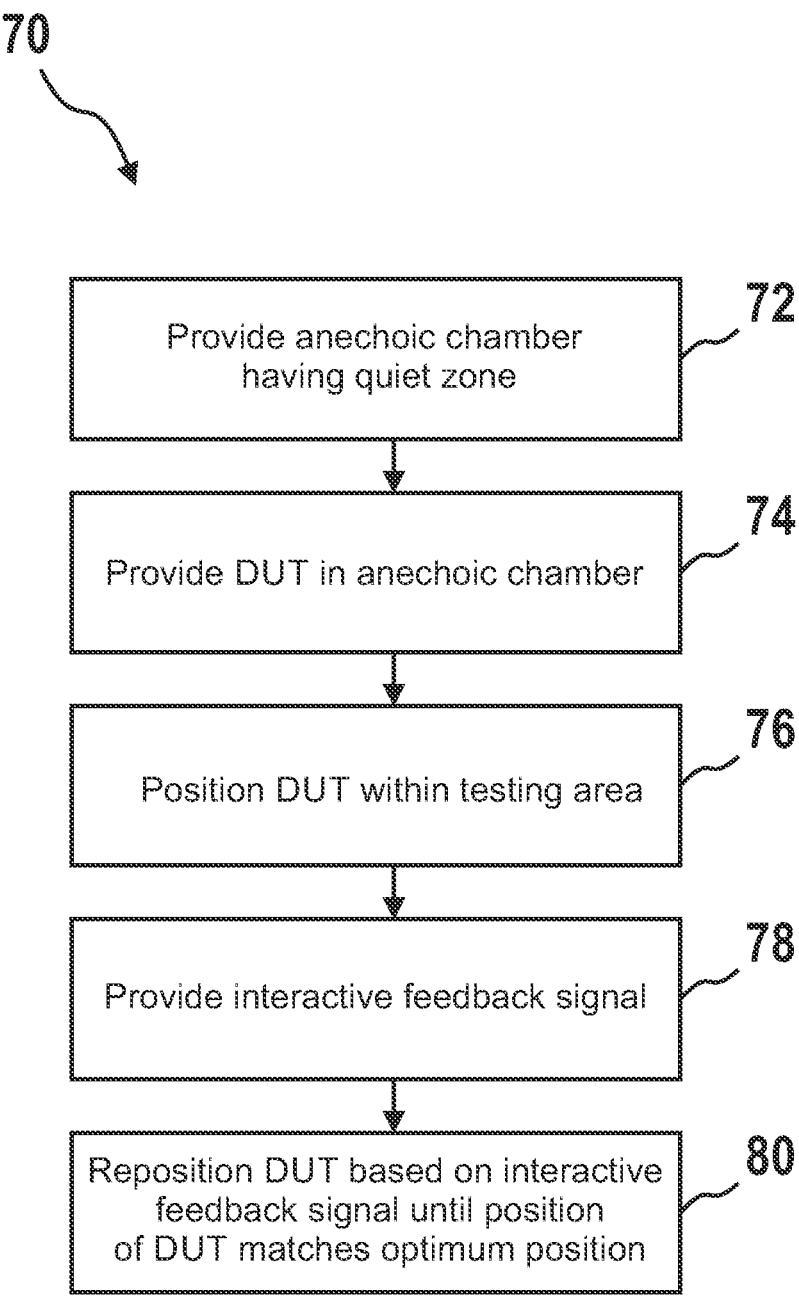
FIG. 4 is a schematic drawing of a method according to an embodiment the disclosure.

FIG. 4 is a schematic drawing of a method 70 according to an embodiment of the disclosure.

In step 72, an anechoic chamber 12 having a quiet zone 16 is provided. In some embodiments, the measurement equipment 28 is provided that can be used for testing the DUT 18.

In step 74, a DUT 18 is provided in the anechoic chamber 12, thereby establishing the system 10 shown in FIGS. 1 and 3.

In step 76, the DUT 18 is positioned within a testing area 13 of the anechoic chamber 12, for example at a random chosen location, also called a best guess location.

In step 78, an interactive feedback signal is provided by a processing circuit 25 based on an evaluation of signals and/or streams of a first and second antenna 22a, 22b of the DUT 18, which were received from the measurement antennas 14a, 14b of the measurement equipment 28.

Finally, in step 80, the DUT 18 is repositioned based on the interactive feedback signal until the position of the DUT 18 matches an optimum position 24 inside the quiet zone 16.

Figure 5:
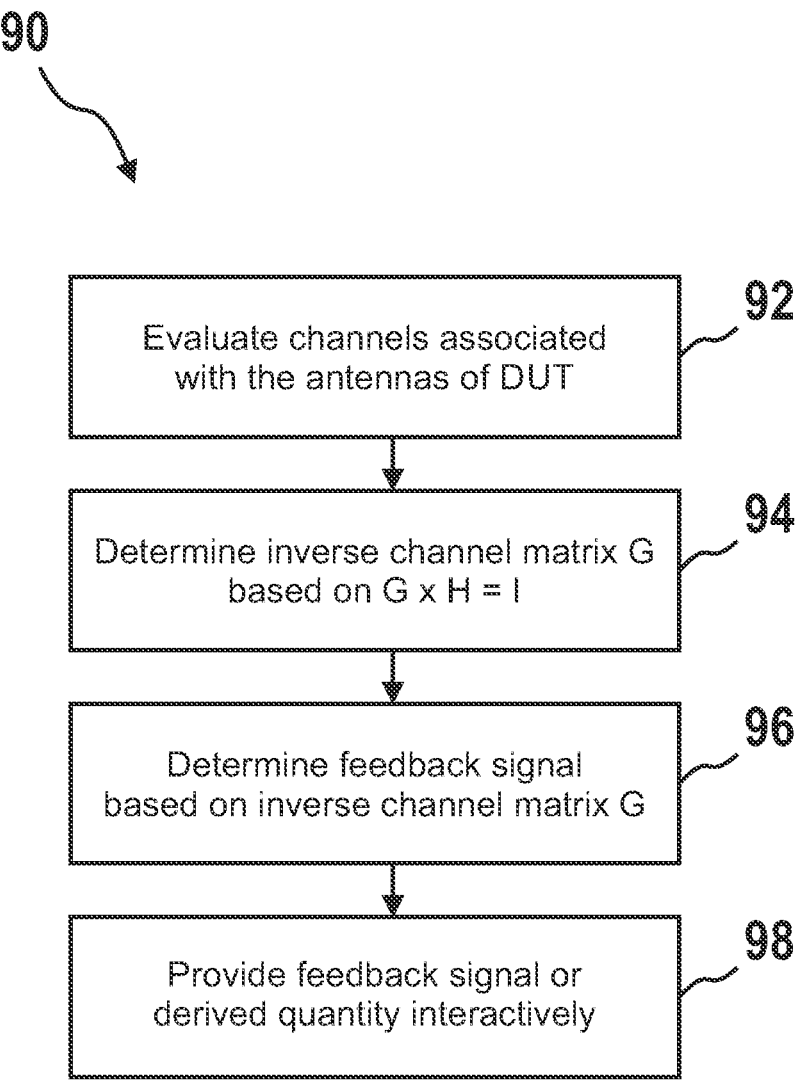
FIG. 5 is a schematic drawing of how the feedback signal may be determined.

FIG. 5 is a schematic drawing of a representative method 90 concerning the determination of the feedback signal according to an embodiment. Method 90 may be considered as describing method 70 in more detail, for example a part thereof.

According to method 90 the channels associated with the first and second antenna 22a, 22b of the DUT 18 are evaluated in step 92, namely the channels established between the antennas 22a, 22b of the DUT 18 and the measurement antennas 14a, 14b of the measurement equipment 28. Accordingly, a channel matrix is determined that describes the interaction of the respective antennas 22a, 22b of the DUT 18 and the measurement antennas 14a, 14b with each other when exchanging signal over-the-air (OTA).

Based on the evaluated signals, namely the channel matrix, an inverse channel matrix G is determined in step 94, wherein $G \times H = I$. I describes the identity matrix. H is the channel matrix describing characteristics of the channels associated with the different antennas 22a, 22b of the DUT 18 depending on the position of the DUT 18 within the anechoic chamber 12.

This means, the matrix H may describe the influence on the (OTA) channels due to the specifics of the measurement setup and the influences among the channels on each other, such as for example cross talk between the channels. By solving the above equation and determining the inverse matrix G, a virtual wireless cable may be determined such that the above-mentioned influences may advantageously be compensated.

The inverse channel matrix G is applied on the streams generated by the measurement equipment 28 so as to pre-compensate the channel matrix. Put differently, a pre-distortion is applied by the inverse channel matrix G, wherein the respective distortion introduced by the channel(s) is compensated accordingly.

Accordingly, based on the inverse channel matrix G, a feedback signal or a reference quantity derived thereof is determined in step 96. In step 98 the feedback signal or the derived reference quantity is interactively provided so as to indicate whether the DUT is placed at an optimum position or not.

In general, this corresponds to the wireless cable method (WCM), as the product of the inverse channel matrix together with the channel matrix relates to the identity matrix, thereby ensuring cable-like characteristics.

In some embodiments, the WCM has an advantage over other methods, e.g. rely on measurement of signal levels, as this only allows a rough estimation of the quality, while the WCM method can guarantee high quality positions.

Figure 6:
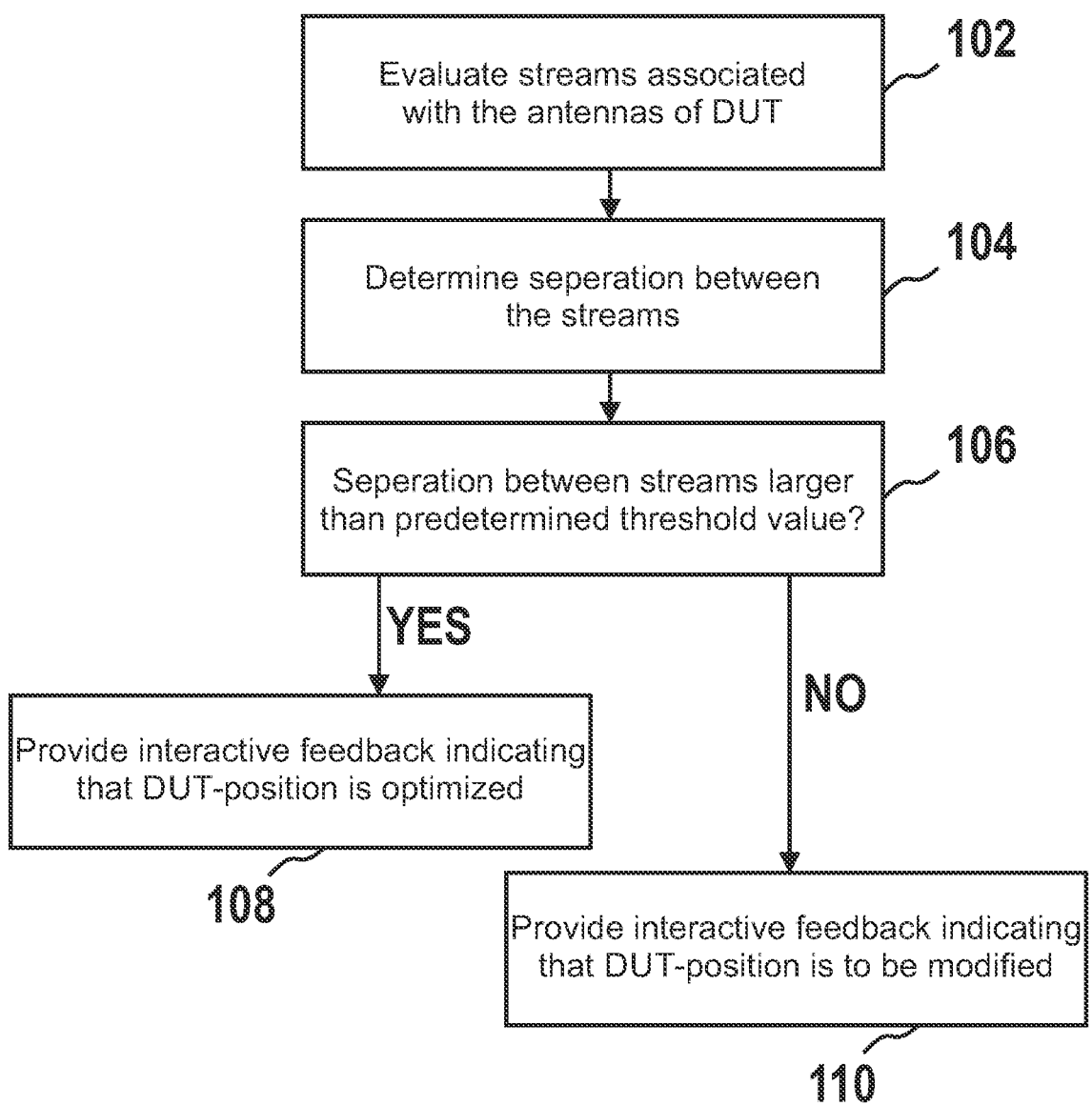
FIG. 6 is a schematic drawing of a different method of determining the feedback signal.

FIG. 6 is a schematic drawing of further details of a representative method 100 of determining the feedback signal.

In step 102 the streams associated with the first and second antenna 22a, 22b of the DUT 18 are evaluated.

In step 104 the separation between the different streams is evaluated, e.g. based on the inverse channel matrix G determined.

In step 106 the processing circuit 25 determines whether the separation between the streams matches or exceeds a predetermined threshold value.

Based on the evaluation done in step 106, the interactive feedback signal or a derived reference quantity indicates that the position of the DUT 18 is optimized in step 108 if the separation matches or exceeds the predetermined threshold value of the separation.

Otherwise the feedback signal or the derived quantity is accordingly altered so as to indicate that the position of the DUT 18 is not yet optimized in step 110.

The difference between steps 108, 110 can be expressed by an indicator signal varying in at least one characteristic between these two configurations, for example a loudness or a frequency and/or brightness or color.

Generally, a combination of an interactive and direct feedback is used in combination with the wireless cable method (WCM). In some embodiments, the WCM is done while the DUT 18 is moved in order to find the optimum position 24.

In some embodiments, the wireless cable method (WCM) calculates the separation between the two MIMO streams, namely the ones provided between the measurement antennas 14a, 14b of the measurement equipment 28 and the antennas 22a, 22b of the DUT 18. Thus, the separation can also be used as a quality gate for good positioning of the DUT 18 within the chamber 12. If the separation archives a certain quality gate or rather threshold (>12 dB separation), the position of the DUT 18 is good and subsequent measurements would be valid.

The test engineer places the DUT 18 inside the chamber 12 and starts a continuous WCM calculation that is done by the processing circuit 25. The results of the calculation are visually and/or acoustically fed back by the indication module 34. The test engineer then manually moves the DUT 18 inside the chamber 12 till the results have reached a certain threshold. Alternatively, a positioner 26 (e.g., having one or more linear or angular stages) is used.

The processing circuit 25 performing the WCM will continuously calculate the MIMO separation and convert the results into visual/acoustic feedback that is outputted by the output, e.g., the indication module 34.

The visual/acoustic feedback loop would be turned on as long as the positioning optimization would take place. Once the optimal position has been found, the test engineer stops the continuous WCM.

Hence, examples of the present disclosure optimize the position of the DUT 18 inside the chamber 12 in order to speed up testing and to achieve good test results afterwards. In other words, after successfully running the method described above, the test engineer can be certain that subsequent measurements of the DUT 18 provide valid results, wherein the same measurement equipment 28 or rather system 10 may be used for testing the DUT 18 subsequently.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for determining an optimum position of a device under test when testing the device under test over-the-air, the method comprising:
   providing an anechoic chamber with a quiet zone;
   providing a device under test within the anechoic chamber, the device under test having at least two antennas;
   positioning the device under test within a testing area inside the anechoic chamber, the testing area comprising an optimum position for the device under test with respect to the quiet zone; and
   providing an interactive feedback signal while repositioning the device under test, wherein based on the interactive feedback signal a position of the device under test is adjusted to match the optimum position,
   wherein the optimum position is determined depending on a wireless cable method, and
   wherein the feedback signal is determined based on a separation between a first stream and a second stream associated with a first antenna and a second antenna of the at least two antennas of the device under test respectively, wherein the optimum position is found if the separation between the first and the second streams exceeds a threshold value.

2. The method of claim 1, wherein the feedback signal comprises an acoustic signal.

3. The method of claim 1, wherein the quiet zone is established by at least one of an indirect far field and a direct far field.

4. The method of claim 1, wherein the feedback signal is determined based on determining an inverse channel matrix G by solving an equation G×H=I, wherein I is an identity matrix, and wherein H is a channel matrix describing characteristics of channels associated with the at least two antennas of the device under test depending on the position of the device under test within the anechoic chamber.

5. The method of claim 1, wherein the feedback signal is acoustically indicated utilizing a noise, the noise being in a frequency range noticeable for humans under usual conditions; and/or wherein the feedback signal is visually indicated utilizing a light, the light being in a frequency range noticeable for humans under usual conditions.

6. The method of claim 1, wherein the optimum position is arranged within the quiet zone such that all antennas of the device under test are located within the quiet zone if the device under test is placed at the optimum position.

7. The method of claim 1, wherein the method is suitable for blackbox positioning of the device under test with respect to the optimum position.

8. The method of claim 1, wherein at least one characteristic of the interactive feedback signal varies while the device under test is moved within the testing area.

9. A system for determining an optimum position of a device under test, the system comprising:
   an anechoic chamber and a device under test, the anechoic chamber having a testing area, the testing area comprising an optimum position for the device under test with respect to a quiet zone of the anechoic chamber, the device under test having at least two antennas; and
   a processing circuit configured to:
      process a sensor signal indicative of a position of the device under test within the testing area; and
      generate an interactive feedback signal based on the sensor signal received such that the position of the device under test is adjustable to match the optimum position based on the interactive feedback signal during repositioning of the device under test,
   wherein the optimum position is determined depending on a wireless cable method, and
   wherein the feedback signal is determined based on a separation between a first stream and a second stream associated with a first antenna and a second antenna of the at least two antennas of the device under test respectively, wherein the optimum position is found if the separation between the first and the second streams exceeds a threshold value.

10. The system of claim 9, further comprising a loudspeaker configured to output the feedback signal that comprises an acoustic signal.

11. The system of claim 9, further comprising at least one antenna configured to generate the quiet zone that is established by at least one of an indirect far field or a direct far field.

12. The system of claim 9, wherein the processing circuit is configured to determine the feedback signal based on determining an inverse channel matrix G by solving an equation G×H=I, wherein I is an identity matrix, wherein H is a channel matrix describing characteristics of channels associated with the at least two antennas of the device under test depending on the position of the device under test within the anechoic chamber.

13. The system of claim 9, wherein the processing circuit is configured to generate the feedback signal acoustically indicatable utilizing a noise, the noise being in a frequency range noticeable for humans under usual conditions; and/or wherein the processing circuit is configured to generate the feedback signal that is visually indicated utilizing a light, the light being in a frequency range noticeable for humans under usual conditions.

14. The system of claim 9, wherein all antennas of the device under test are located in the quiet zone if the device under test is placed at the optimum position.

15. The system of claim 9, wherein the system is configured for blackbox positioning of the device under test with respect to the optimum position.

16. The system of claim 9, wherein at least one characteristic of the interactive feedback signal is dependent on a movement of the device under test within the testing area.

* * * * *